(12) United States Patent
Dean

(10) Patent No.: US 8,455,574 B2
(45) Date of Patent: Jun. 4, 2013

(54) COMPOSITE COMPOSITIONS COMPRISING CELLULOSE AND POLYMERIC COMPONENTS

(75) Inventor: David M. Dean, West Chester, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 92 days.

(21) Appl. No.: 11/059,252

(22) Filed: Feb. 16, 2005

(65) Prior Publication Data

US 2005/0187315 A1   Aug. 25, 2005

Related U.S. Application Data

(60) Provisional application No. 60/545,868, filed on Feb. 19, 2004.

(51) Int. Cl.
*B29C 47/00* (2006.01)
*C08F 220/10* (2006.01)

(52) U.S. Cl.
USPC .......................................................... 524/13

(58) Field of Classification Search
USPC ........... 106/15.05; 428/178; 524/13; 526/329
See application file for complete search history.

(56) References Cited

U.S. PATENT DOCUMENTS

| | | | |
|---|---|---|---|
| 3,539,661 A * | 11/1970 | Rauch-Puntigam | 526/194 |
| 4,192,930 A * | 3/1980 | Beck et al. | 524/275 |
| 4,203,884 A | 5/1980 | Coran et al. | |
| 4,351,931 A | 9/1982 | Armitage | |
| 4,717,742 A | 1/1988 | Beshay | |
| 5,212,219 A * | 5/1993 | Griffin | 524/17 |
| 5,240,894 A | 8/1993 | Burkhardt et al. | |
| 5,264,405 A | 11/1993 | Canich | |
| 5,272,236 A | 12/1993 | Lai et al. | |
| 5,278,272 A | 1/1994 | Lai et al. | |
| 5,507,475 A | 4/1996 | Seel et al. | |
| 5,902,869 A | 5/1999 | Chou | |
| 6,011,091 A | 1/2000 | Zehner | |
| 6,066,680 A | 5/2000 | Cope | |
| 6,103,791 A | 8/2000 | Zehner | |
| 6,265,037 B1 * | 7/2001 | Godavarti et al. | 428/34 |
| 6,680,090 B2 | 1/2004 | Godavarti et al. | |
| 6,953,501 B2 * | 10/2005 | Kelley et al. | 106/15.05 |
| 2002/0016388 A1 | 2/2002 | Kitayama et al. | |
| 2002/0161072 A1 | 10/2002 | Jacoby et al. | |
| 2003/0021915 A1 | 1/2003 | Rohatgi et al. | |
| 2003/0228454 A1 | 12/2003 | Barlow et al. | |
| 2003/0229160 A1 | 12/2003 | Williams et al. | |
| 2004/0204519 A1 | 10/2004 | Fender et al. | |
| 2005/0171247 A1 | 8/2005 | Yasuda et al. | |
| 2006/0094802 A1 | 5/2006 | Gibson et al. | |
| 2006/0128870 A1 | 6/2006 | Marx et al. | |

FOREIGN PATENT DOCUMENTS

| | | | |
|---|---|---|---|
| JP | 55131031 | | 10/1980 |
| WO | WO02/102586 A2 | | 12/2002 |
| WO | WO/03/099930 | * | 12/2003 |
| WO | WO2004/092279 A1 | | 10/2004 |

OTHER PUBLICATIONS

"Polyethylene," Hawley's Condensed Chemical Dictionary, 14th Edition, Copyright © 2002 by John Wiley & Sons, Inc.*
PCT International Search Report, International Application No. PCT/US2005/005044, Filed Feb. 17, 2005.
"Effectiveness of Functionalized Polyolefins as Compatibilizers for Polyethylene/Wood Flour Composites,"Y. Wang, F.C. Yeh, S.M. Lai, H.C. Chan, and H.F. Shen in Polym. Eng. and Sci. Apr. 2003, vol. 43, n.4, p. 933.
"Surface of Cellulosic Materials Modified with Functionalized Polyethylene Coupling Agents," Q. Li and L.M. Matuana in J. of Appl. Polym. Sci., (2003) vol. 88, p. 278.
"High Flexibility EMA Made from High Pressure Tubular Process" (Annual Technical Conference—Society of Plastics Engineers (2002), 60th(vol. 2), 1832-1836).

* cited by examiner

*Primary Examiner* — Liam Heincer

(57) ABSTRACT

The present invention is a composite composition comprising cellulosic material in a polymeric matrix comprising a thermoplastic polymer, and at least one compatibilizing copolymer prepared from an olefin and a functional comonomer, and articles prepared from such composites. The composition of the present invention can be useful as a synthetic wood.

5 Claims, No Drawings

COMPOSITE COMPOSITIONS COMPRISING CELLULOSE AND POLYMERIC COMPONENTS

This application claims the benefit of U.S. Provisional Application No. 60/545,868, filed Feb. 19, 2004.

FIELD OF THE INVENTION

This invention relates to compositions comprising a mixture of thermoplastic polymer, cellulosic fiber, and at least one copolymer that functions as a compatibilizing agent, and articles prepared therefrom. This invention particularly relates to such compositions comprising a copolymer of ethylene as the compatibilizing agent.

BACKGROUND OF THE INVENTION

With the rising cost of wood and the shortage of mature trees, there is a present need to find good quality substitutes for wood which will continue long into the future. Over the past several years a growing market has emerged for the use of polymer-wood composites to replace traditional solid wood products in applications such as decking, windows, fencing, automobile interiors and pallets. These composite materials typically consist of mixtures of thermoplastic materials with wood particles in the form of sawdust. The composite materials may be used in many of the same applications as an all-wood product but offer the advantages of providing enhanced resistance to: rot; attack by insects; and, deterioration due to the effects of moisture. These products can have the same workability as wood and are splinter-free.

Recently there has been an increased interest in composite materials as a viable outlet for recycled thermoplastic materials. This interest has been spurred by the prospect of environmental regulations mandating the recycling of these materials. Another benefit is that landfill space may be conserved if both spent sawdust and used plastic materials are reused rather than disposed of in a landfill.

U.S. Pat. No. 6,011,091 teaches a cellulosic composite containing from 60 to 70% cellulosic material, from 30 to 40% polyvinyl chloride material and up to 4% by weight of polar thermosetting material. U.S. Pat. No. 6,103,791 discloses a cellulosic composite comprising from 50 to 65% cellulosic material, from 25 to 30% polyvinyl chloride material and up to 4% by weight of polar thermosetting material.

U.S. Pat. No. 6,066,680 describes an extruded composite formed from foamable plastic containing a polymer resin and wood flour particles. The polymer resins described are polyvinyl chloride, chlorinated polyvinyl chloride and polystyrene. Published U.S. patent application Ser. No. 2003/0229160 describes composites comprising a polymer and a cellulosic fiber. Generally, conventional art describes the use of grafted-maleic anhydride polymers, or copolymers that incorporate a low level (less than 3 wt %) of functionality capable of forming covalent bonds with cellulosic material.

Maleic anhydride-grafted polymers (maleated polymers) and ethylene copolymers are known and conventional compatibilizers (also interchangeably referred to herein as "coupling agents") for wood composites. Maleic anhydride-grafted polymers as used herein include maleated polyethylene, maleated polypropylene, maleated styrene-ethylene-butene-styrene triblock copolymer, and maleated polybutadiene. General discussions of anhydride coupling agents in wood composites can be found in: "Effectiveness of Functionalized Polyolefins as Compatibilizers for Polyethylene/Wood Flour Composites," Y. Wang, F. C. Yeh, S. M. Lai, H. C. Chan, and H. F. Shen in Polym. Eng. and Sci. April 2003, vol. 43, n. 4, p. 933; and, "Surface of Cellulosic Materials Modified with Functionalized Polyethylene Coupling Agents," Q. Li and L. M. Matuana in J. of Appl. Polym. Sci., (2003) vol. 88, p. 278.

The use of maleated polyolefins is not trouble-free, however. Grafting of maleic anhydride at a concentration of greater than two-weight % can be difficult and/or troublesome. To achieve higher levels of grafting, such as for example 3 wt %, it can be necessary to include a free-radical initiator in a higher concentration. Using the initiator at higher concentrations can cause undesirable side reactions, such as crosslinking and chain scission. Further, the cost of producing maleated polyolefins with high maleic graft levels can be substantial. Further, it can be problematical to produce maleic anhydride copolymers having 3 wt % maleic anhydride functionality by direct copolymerization. For example, U.S. Published patent application Ser. No. 2003/0021915 A1 discloses the use of Lotader 2210 and 3410, available from Atofina, which is an ethylene/maleic anhydride direct copolymer having less than 3 wt % maleic anhydride functionality.

It can be desirable for inclusion in a wood composite composition to have compatibilizers having included therein greater amounts of coupling functionality without the problems associated with higher levels of grafting in maleated polyolefins. A present need exists for a polymer-cellulosic fiber composite based on an easily processible polymer which has weatherability and dimensional stability which are at least at the same level as conventional products.

Non-grafted ethylene copolymers that include reactive functional groups such as maleic anhydride or a functional equivalent can be obtained by a high-pressure free radical process.

BRIEF SUMMARY OF THE INVENTION

This invention provides a wood composite composition, comprising:
(1) from about 20 to about 70 weight % cellulosic material, based on the total weight of the composite composition; and
(2) from about 80 wt % to about 30 wt % of a polymeric matrix composition comprising
  (a) a polymeric base resin in an amount from about 30 to about 80 weight %, based on the total weight of the composition; and
  (b) a compatibilizing copolymer comprising ethylene and a functional comonomer, wherein the functional comonomer is included in the copolymer in an amount of 3 weight % or greater, and wherein the copolymer is included in the composite composition in an amount from about 0.1 to about 10 weight % of the total weight of the composite composition.

This invention also provides an article comprising the wood composite composition of the present invention.

DETAILED DESCRIPTION OF THE INVENTION

All references disclosed herein are incorporated by reference.

"Copolymer", as term is used herein, has its conventional meaning known to one of ordinary skill in the art to be a polymer formed by the copolymerization of two or more monomeric components to yield a single polymer. The use of specific numeric prefixes herein shall identify the number of components used to obtain a specific copolymer.

Thermoplastic compositions are polymeric materials that can flow when heated under pressure. Melt index (MI) is the mass rate of flow of a polymer through a specified capillary under controlled conditions of temperature and pressure. Melt indices reported herein are determined according to ASTM 1238 at 190° C. using a 2160 g weight, with values of MI reported in grams/10 minutes.

In one embodiment, the present invention is directed to a composite wood composition which is a polymer-cellulose composite composition comprising a polymer, such as a high density polyethylene (HDPE), admixed with cellulosic fiber and at least one compatibilizing copolymer obtained from an olefin and a functional comonomer.

The cellulosic material may be derived from wood in the form of sawdust, in a fibrous form with an aspect ratio (that is, the ratio of fiber length to fiber diameter) of greater than 1, wood flour or the like, or may be derived from other sources such as recycled paperboard.

In the practice of the present invention, cellulosic material is combined with a polymeric matrix that includes a base polymer resin and a compatibilizer. The current invention produces improved wood filled polymer compositions by using as compatibilizers olefin/maleate copolymers such as ethylene/maleic anhydride (E/MAH) or ethylene/ethyl hydrogen maleate (also known as ethylene/maleic acid monoester, or E/MAME) copolymer. Compatibilizers of the present invention are synthesized directly in a high-pressure autoclave. This eliminates the secondary process step of grafting traditionally used to create compatibilizers and allows use of higher amounts of coupling functionality than conventional compatibilizers.

Compatibilizing Agent

A wood composite of this invention comprises a copolymer that functions to compatibilize the wood composite. A compatibilizing copolymer suitable for use in the practice of the present invention can function to couple various components of the wood composite by covalent chemical bonding, and/or can change the chemical environment of the wood composite such that all of the components in the mixture are dispersed to form a stable composite. Whether a compatibilizer acts as a coupling agent or by some other mode is not critical in the practice of the present invention. A compatibilizer of the present invention can be an improved compatibilizer over conventional coupling compatibilizers, and offer greater coupling functionality.

A compatibilizing copolymer (hereinafter, compatibilizer) is the copolymerization reaction product obtained from an olefin and at least one other comonomer. Olefins useful in the practice of the present invention include and are selected from olefins such as ethylene, propylene, isomers of butylene, and/or other olefins typically used in conventional polymerization reactions that employ either traditional (Zieglar-Natta) catalysts or metallocene catalysts. Preferably, a copolymer of the present invention is the product of copolymerization of ethylene and at least one other comonomer.

Suitable compatibilizers of the present invention comprise a functional comonomer. Functional comonomers as the term is used herein are monomers that can be copolymerized with a suitable olefin, under conditions suitable for olefin-polymerization, wherein the comonomer further comprises anhydride functionality. Preferably the functional comonomer is maleic anhydride or a functional equivalent thereof. Such equivalents include, for example: derivatives of maleic anhydride such as maleic acid and/or salts thereof; maleic acid diesters or monoesters, including esters of $C_1$-$C_4$ alcohols, such as, for example, methyl, ethyl, n-propyl, isopropyl, and n-butyl alcohols; itaconic acid; fumaric acid; fumaric acid monoester; or mixtures of any of these. More preferably the functional comonomer is maleic anhydride, or monoesters and/or diesters of maleic acid.

It can be preferred in the practice of the present invention to use as a compatibilizer, terpolymers of: ethylene (E); maleic anhydride or equivalents; and a third comonomer, X, wherein X is a monomer selected from the group consisting of vinyl acetate, (meth)acrylic acid, and/or derivatives thereof. Suitable derivatives of (meth)acrylic acid include salts, esters, anhydrides, or other acid derivatives known to one of ordinary skill in the chemical arts. Preferred acid derivatives include methyl acrylate and butyl acrylate, for example.

Compatibilizing copolymers useful herein are obtained directly from the monomers by a high-pressure free radical polymerization process. A high-pressure process suitable for use in the practice of the present invention is described, for example, in U.S. Pat. No. 4,351,931.

These compatibilizers can be present in an amount of from about 0.1 to about 10 weight % based on the total weight of the composition to achieve improvements in the physical, mechanical and thermal characteristics of the materials. Preferably the compatibilizer is present in an amount of from about 0.1 wt % to about 5 wt %, more preferably in an amount of from about 1 wt % to about 4 wt %.

It is preferable to use as little of the compatibilizing material as necessary to obtain the result desired. Therefore, generally, it can be desirable to have as high a functional monomer content as can be obtained to gain the compatibilizing effect with the least amount of compatibilizer. In this regard it is preferable to have at least about 3 wt % of a functional comonomer in a compatibilizing material of the present invention. In practice, only the process for producing the functional copolymers limits the upper limit for incorporation of the functional comonomer into a suitable copolymer. More preferably, the functional comonomer is in the range of greater than about 3 wt % to about 25 wt %, based on the weight of the copolymer. Even more preferably, the functional comonomer is incorporated into the copolymer in an amount of from about 3.5 wt % to about 15 wt %, most preferably in a range of from about 4 wt % to about 12.5 wt %.

Compatibilizers of the present invention, particularly those that include a greater amount of functional comonomer, can be blended with other polymeric materials to dilute the concentration of the functionality and thereby provide a blended composition for use in various types of wood composite materials.

Polymer Base Resins

The polymeric matrix comprises as a second component a thermoplastic polymer base resin. A base resin is included in a composite of the present invention in an amount of from about 20 wt % to about 80 wt %, based on the total weight of the composite composition. For extruded products, preferably the base resin is included in an amount of from about 35 to about 60 wt %, more preferably in an amount of from about 40 to about 55 wt %, and most preferably in an amount of from about 42 wt % to about 50 wt %. For injection molded products, more base resin is usually needed in the composition in order to have adequate flow of the molten material; and therefore, preferably contains from about 65 to 80 wt % of the base resin.

The polymers useful as base resins in the composition of the present invention include, for example, polyolefins such as: high density polyethylene (HDPE); low density polyethylene (LDPE); linear low density polyethylene (LLDPE); ultrahigh molecular weight polyethylene (UHMWPE); ultra low density polyethylene (ULDPE); copolymers of ethylene and a second α-olefin monomer obtained using a metallocene catalyst (metallocene polyethylenes, or MPE); ethylene/propylene copolymers; terpolymers such as ethylene/propylene/diene monomer (EPDM); and polypropylene homo- and copolymers.

Suitable base resins may also include ethylene copolymers obtained from copolymerization of ethylene with a polar monomer such vinyl acetate monomers, acrylate and methacrylate monomers, acrylic acid monomers and salts thereof, for example. Such suitable copolymers include, for example: ethylene acrylate copolymers; ethylene vinyl acetate copolymers; ethylene acrylic acid copolymers; ethylene methacrylic acid copolymers; salts derivable from ethylene acrylic and/or methacrylic acid copolymers; ethylene acrylic ester copolymers; ethylene methacrylic ester copolymers; polyvinyl chloride; chlorinated polyvinyl chloride; polystyrene; and/or mixtures of any of these.

Preferably, the base resin is a thermoplastic polymer that can be processed in the melt at temperatures below 220° C., such as MPE, LLDPE, HDPE, polypropylene, and ethylene copolymers of ethylene and acrylate monomers. Most preferably the base resin is HDPE.

In a particularly preferred embodiment, where ethylene copolymers are included, the ethylene copolymer is of the type that is prepared in a tubular reactor, according to the procedure described in the article "High Flexibility EMA Made from High Pressure Tubular Process" (Annual Technical Conference—Society of Plastics Engineers (2002), 60th (Vol. 2), 1832-1836).

Without being held to theory, MPE is of note in the practice of the present invention because of its substantially linear structure and narrow molecular weight distribution of MPE.

MPE technology is described in, for example, U.S. Pat. No. 5,272,236; U.S. Pat. No. 5,278,272, U.S. Pat. No. 5,507,475, U.S. Pat. No. 5,264,405, and U.S. Pat. No. 5,240,894.

Cellulosic Materials

A wide variety of cellulosic materials can be employed in the present invention. Illustrative cellulosic materials can be obtained from, but not limited to, the following sources: wood and wood products, such as wood pulp fibers; non-woody paper-making fibers from cotton; straws and grasses, such as rice and esparto; canes and reeds, such as bagasse; bamboos; stalks with bast fibers, such as jute, flax, kenaf, cannabis, linen and ramie; and leaf fibers, such as abaca and sisal; paper or polymer-coated paper including recycled paper and polymer-coated paper. One or more cellulosic materials can be used. Preferably the cellulosic material used is from a wood source. Suitable wood sources include softwood sources such as pines, spruces, and firs, and hardwood sources such as oaks, maples, eucalyptuses, poplars, beeches, and aspens. The form of the cellulosic materials from wood sources can be sawdust, wood chips, wood flour, or the like.

In addition to sawdust, agricultural residues and/or waste can be used as a source of cellulosic materials in the practice of the present invention. Agricultural residues are the remainder of a crop after the crop has been harvested. Examples of such suitable residues include residues from the harvesting of wheat, rice, and corn, for example. Examples of agricultural waste suitable for use herein is: straw; corn stalks; rice hulls; wheat; oat; barley and oat chaff; coconut shells; peanut shells; walnut shells; jute; hemp; bagasse; bamboo; flax; and kenaf; and combinations thereof.

The cellulosic materials may be screened through various screens, e.g., a 30-mesh or a 40-mesh screen, to obtain a mixture of different size material. The size of the cellulose material used in the composition of the present invention range from about 10 to about 100 mesh, and preferably from about 40 to about 100 mesh.

The wood flours used in a composition of the present invention include soft and hard woods and combinations thereof. Preferable wood flours are oak and pine, available as Oak 4037 (40 mesh) and Pine 402050 (40 mesh), respectively from American Wood Fibers of Schofield, Wis. Another preferred wood flour is maple.

A composite composition of the present invention can include from about 20 to about 70 weight % of cellulosic fiber, based upon the weight of the total composition, preferably from about 40 to about 60 weight %, and more preferably from about 50 wt % to about 65 wt %. The composite composition can include from about 30 wt % to about 80 wt % of the polymeric matrix component which comprises the base resin and the compatibilizer. For extruded parts, preferably the polymeric component is included in the composite composition in an amount of from about 35 to about 60 wt %, and more preferably in an amount of from about 40 to about 55 wt %, based on the total weight of the composite composition. For injection molded products, more polymer is usually needed in the composition in order to have adequate flow of the molten material; and therefore, the compositions for injection molding preferably contains from about 65 to 80 wt % of the polymeric component.

The compositions of the present invention can further comprise optional materials, such as conventional additives used in polymeric materials including plasticizers, stabilizers including viscosity stabilizers and hydrolytic stabilizers, antioxidants, ultraviolet ray absorbers, anti-static agents, dyes, pigments or other coloring agents, inorganic fillers, fire-retardants, lubricants, reinforcing agents such as glass fiber and flakes, foaming or blowing agents, processing aids, antiblock agents, release agents, and/or mixtures thereof. Optional ingredients, when used, can be present in various quantities—with the proviso that they are not used in an amount that detracts from the basic and novel characteristics of the composition.

An inorganic filler can optionally be used that comprises particles of inorganic compounds, such as minerals and salts. More preferred fillers are calcium carbonate and talc $(Mg_3Si_4O_{10}(OH)_3)$, and most preferred is talc. The amount of filler that can be added to the composition of the present invention is from about 0 to about 15 weight %.

Foaming or blowing agents can be incorporated in amounts up to 3% by weight to reduce the density of the artificial lumber product, and also to "size" the product to the required dimensions in an extrusion process. Suitable foaming or blowing agents include, for example, Safoam FPE 50 available from Reedy International Corp. Other suitable foaming or blowing agents include exothermic blowing agents such as azodicarbonamide, 4,4-oxy-bis(benzenesulfonyl hydraziole), p-toluenesulfonyl semicarbazide, phenyl tetrazole and endothermic blowing agents such as inorganic carbonates and bicarbonates including magnesium carbonate and bicarbonate.

Heat stabilizers can optionally be used in any amount up to 1 weight % to prevent degradation of the wood composite due to heat histories. Suitable heat stabilizers include, for example, a calcium/phosphate derivative of a hindered phenol sold under the trademark Recyclostab 411 by Ciba Geigy Chemicals. The heat stabilizer compound can also be a compound selected from the group consisting of hydroxyamines, phenols, phosphates and metal soaps.

Suitable optional antioxidants include alkylated phenols and bis-phenols such as hindered phenols, polyphenols, thio and di-thio polyalkylated phenols, lactones such as 3-arylbenzofuran-2-one and hydroxyl-amine as well as Vitamin E.

Reinforcing agents such as glass fiber and flakes can optionally be used to improve flex modulus of the wood composite, allowing it to have greater stiffness and strength suitable for structural applications.

Compositions of the present invention can be formed into shaped articles using methods such as injection molding, compression molding, overmolding, or extrusion. Optionally, formed articles comprising the wood composite of the present invention can be further processed. For example, pellets, slugs, rods, ropes, sheets and molded articles of the present invention may be prepared and used for feedstock for subsequent operations, such as thermoforming operations, in which the article is subjected to heat, pressure and/or other mechanical forces to produce shaped articles. Compression molding is an example of further processing.

The compositions of this invention can be cut, injection molded, compression molded, overmolded, laminated, extruded, milled or the like to provide the desired shape and size to produce commercially usable products. The resultant product has an appearance similar to wood and may be sawed, sanded, shaped, turned, fastened and/or finished in the same manner as natural wood. It is resistant to rot and decay as well as termite attack and may be used as a replacement for natural wood, for example, as decorative moldings inside or outside of a house, picture frames, furniture, porch decks, railings, window moldings, window components, door components, roofing systems and other types of structural members.

While inclusion of certain optional components can be preferred, the exclusion of any optional component can be warranted for any reason. Such reasons can include cost, aesthetics, or any other consideration deemed important to the practitioner. For example, an optional component can be excluded to obtain a commercial or business advantage over similar products. Further, if by their inclusion the basic and novel characteristics of the wood composite composition of the present invention are affected, any optional component can be excluded. For example, color, smell, appearance, feel, safety in handling or using, for the purposes of the present invention are considered basic characteristics of the present invention. Any optional component that interferes with these characteristics, among others, can be excluded from the composition claimed herein.

Notwithstanding the use of broad claim language herein, any optional component, the inclusion of which negatively affects the novelty of the invention as claimed herein, or the inclusion of which would be detrimental to the purpose for which this invention is intended, can be excluded from the claimed invention.

EXAMPLES

While the invention has been particularly shown and described with reference to the preferred embodiments thereof, it will be understood by those skilled in the art that various changes in form and details may be made without departing from the spirit and scope of the invention.

The following Examples are merely illustrative, and are not to be construed as limiting the scope of the invention described and/or claimed herein.
Materials Used
WF1—40 mesh oak wood flour; available from American Wood Fibers of Schofield, Wis. as Oak 4037
PE1—Linear low density polyethylene (LLDPE) available from Nova as Sclair® 11E1.
PE2—High density polyethylene (HDPE) available from Nova as Sclair® 2907, MI of 5.
M1—polyethylene/maleic anhydride (MAH) graft copolymer; melt index (MI)=1.5, and density (d)=0.93 g/cc; available from DuPont as Fusabond® E MB226D with less than 2.0 wt % maleic anhydride graft.
M2—polyethylene/ethyl maleic acid monoester (MAME) having 9 wt % MAME and with an MI of 30.
M3—polyethylene/ethyl maleic acid monoester having 4.4 wt % MAME and with an MI of 3.5.
M4—polyethylene/ethyl maleic acid monoester having 6 wt % MAME and with an MI of 30.
M5—polyethylene/ethyl maleic acid monoester having 7.6 wt % MAME and with an MI of 30.
M6—polyethylene/maleic anhydride having 4 wt % MAH and with an MI of 65.

All parts and percentages are given by weight unless otherwise indicated.
General Procedure for Mixing the Wood Composites Wood flour (WF1) is dried for 48 hours in a desiccated tray drier oven at about 170° F. prior to processing. Samples are prepared in 350-gram lots according to the following procedure.

A Brabender paddle mixer with a 350 cc mixing head is heated up to 165° C. PE1 and the modifier (M1 or M2) are mixed together, charged to the mixer, and mixed in the mixer for about 20 seconds. The wood flour WF1 is added to the mixer in four equal parts. A charging chute is used for the first three parts and the fourth part is added using a charging ram.

The mixed blend is removed from the hot mixer and placed on aluminum plates preheated to 193° C. for processing. The material is inserted into a heated (180° C.) 24"×24" press (available from PHI) and held for 3 to 4 minutes before external pressure is applied and gradually increased to a maximum of 25 tons with no hold time. The material is removed from the hot press and cut, while still hot, into 6"×6" squares for compression molding. A 6"×6"×⅛" steel picture frame mold is used. This mold is sandwiched between two steel plates. The sample is placed in the mold, and the sample/mold assembly is inserted into the preheated (193° C.) 24"×24" PHI press. The assembly is equilibrated for five minutes before pressure is applied and gradually increased to a maximum of 25-tons, and held at the maximum pressure for 1 minute. The pressure is slowly released and the assembly is then transferred to a 24"×24" room temperature press where pressure is applied and rapidly increased to a minimum of 25 tons. The pressure is maintained for about 5 minutes or until the steel plates are warm to the touch. The 6×6" sample plate is removed from the mold and the process repeated six times for each sample to provide seven sample plates for each composition (see Tables 1 to 3). The completed samples for the Table 1 materials were die cut on a ratchet-type clicker into ASTM flex and tensile bars to be tested for the physical properties reported in Tables 4 and 5. The completed samples for the Table 2 and Table 3 materials were router-cut using a power saw with a blade suitable for woodworking into ASTM flex and tensile bars. The physical properties for the Table 2 and Table 3 materials are reported in Tables 6 and 7.

Examples 3 and 5 in Table 1 are wood composite compositions of this invention. Comparative Example C1 is a composition of wood flour and LLDPE without a coupling agent. Comparative Examples C2 and C4 are composition of wood flour, LLDPE and a conventional maleated polyethylene graft copolymer coupling agent.

In Table 2 and Table 3, Examples 10 through 20 are wood composite compositions of this invention. Comparative Example C6 is a composition of wood flour and HDPE without a coupling agent. Comparative Examples C7, C8, and C9 are compositions of wood flour, HDPE, and a conventional MAH-grafted coupling agent.

TABLE 1

| | Component (wt %) | | | |
|---|---|---|---|---|
| Example | WF1 | PE1 | M1 | M2 |
| C1 | 55% | 45% | — | — |
| C2 | 55% | 44% | 1% | — |
| 3 | 55% | 44% | — | 1% |
| C4 | 55% | 43% | 2% | — |
| 5 | 55% | 43% | — | 2% |

TABLE 2

| | Component (wt %) | | | |
|---|---|---|---|---|
| Example | WF1 | PE2 | M1 | M2 |
| C6 | 55% | 45% | — | — |
| C7 | 55% | 44.5% | 0.5% | — |
| C8 | 55% | 44% | 1% | — |
| C9 | 55% | 43% | 2% | — |
| 10 | 55% | 44.5% | — | 0.5% |
| 11 | 55% | 44% | — | 1% |
| 12 | 55% | 43% | — | 2% |

TABLE 3

| | Component (wt %) | | | | | |
|---|---|---|---|---|---|---|
| Example | WF1 | PE2 | M3 | M4 | M5 | M6 |
| 13 | 55% | 44.5% | 0.5% | — | — | — |
| 14 | 55% | 43% | 2% | — | — | — |
| 15 | 55% | 44.5% | — | 0.5% | — | — |
| 16 | 55% | 43% | — | 2% | — | — |
| 17 | 55% | 44.5% | — | — | 0.5% | — |
| 18 | 55% | 43% | — | — | 2% | — |
| 19 | 55% | 44.5% | — | — | — | 0.5% |
| 20 | 55% | 43% | — | — | — | 2% |

Test Procedures

Izod impact was measured using ASTM D-256 using bars 5 inches long, ½ inch wide and ⅛ inch thick.

Tensile strength was measured by testing bars cut from the ⅛ inch thick compression molded sheets using a cross-head speed of 2 inches per minutes and following ASTM D-638.

Flexural strength and modulus were measured by testing bars cut from the ⅛ inch thick compression molded sheets using a cross-head speed of 0.05 inch/minute according to ASTM D-790

Viscosity was measured using a capillary die rheometer. Table 5 gives the viscosity at 180° C. as a function of shear rate.

Water absorption was measured on flex bars (5 inches long, ½ inch wide, and ⅛ inch thick) cut from the compression-molded sheet and following the ASTM D-570 test method.

TABLE 4

| | Example | | | | |
|---|---|---|---|---|---|
| | C1 | C2 | 3 | C4 | 5 |
| Notched Izod at 23 C., Ft-lb/in (average of 5 samples) ASTM D256 | 0.78 | 1.62 | 1.32 | 1.85 | 1.39 |
| Complete Break | 3 | 3 | 4 | 1 | 4 |
| Partial break | 1 | 2 | — | 3 | 1 |
| Hinge Break | 1 | — | 1 | 1 | — |
| Flex Modulus Mpa ASTM D790 | 1523 | 1466 | 1695 | 1749 | 1630 |
| Tensile Strength psi | 921.2 | 3119.5 | 3111.3 | 1820.3 | 3063.6 |
| Break Strength psi | 490.4 | 3087.8 | 3102.9 | 2819.9 | 2929.5 |
| Elongation % | 3 | 5 | 3 | 2 | 5 |

TABLE 5

| | Apparent Viscosity (Pa-s) | | | | |
|---|---|---|---|---|---|
| Rate (1/s) | C1 | C2 | 3 | C4 | 5 |
| 316.2 | 1578.1 | 1457.4 | 1386.3 | 1501.2 | 1311.6 |
| 7.3 | 28418.5 | 25340.6 | 26791.8 | 30172.7 | 27341.3 |
| 681 | 727.2 | 725 | 694.2 | 758.8 | 692 |
| 316.2 | 1510.4 | 1363.1 | 1324.5 | 1421.7 | 1271.1 |
| 145.9 | 3065.9 | 2744.6 | 2693.5 | — | 2935 |
| 73 | 4935.8 | 5608.7 | 5581.6 | — | 5530.4 |
| 36.5 | 7843 | 10279.8 | — | — | 9897.1 |
| 12.2 | 17673.1 | 20199.1 | — | — | 19006.6 |
| 1447.2 | 377.2 | 367.5 | — | — | 354.2 |
| 1994.5 | 280.2 | 279.4 | — | — | — |
| 3089 | — | 186.2 | — | — | — |

TABLE 6

| | Example | | | | | | |
|---|---|---|---|---|---|---|---|
| | C6 | C7 | C8 | C9 | 10 | 11 | 12 |
| Notched Izod at 23 C., Ft-lb/in (average of 5 samples) ASTM D256 | 0.5 | 0.9 | 1.1 | 1.0 | 0.7 | 0.7 | 0.7 |
| Tensile Strength (psi) (ASTM D638) | 1600 | 3500 | 3700 | 4000 | 3400 | 2900 | 2400 |
| Flex Break Strength (psi) (ASTM D790) | 3500.0 | 7200 | 7900 | 8100 | 7200 | 6200 | 5500 |
| Flex Modulus (kpsi) (ASTM D790) | 330 | 370 | 410 | 430 | 400 | 390 | 350 |
| Water Absorption (%) (2 hrs) ASTM D570 | 1.2 | 0.8 | NM | 0.7 | 0.8 | NM | 0.8 |
| Water Absorption (%) (24 hours) ASTM D570 | 3.3 | 1.7 | NM | 1.4 | 1.4 | NM | 1.8 |

TABLE 6-continued

|  | Example | | | | | | |
| --- | --- | --- | --- | --- | --- | --- | --- |
|  | C6 | C7 | C8 | C9 | 10 | 11 | 12 |
| Water Absorption (%) (48 hours) ASTM D570 | 4.7 | 2.1 | NM | 1.9 | 1.8 | NM | 2.2 |
| Water Absorption (%) (7 days) ASTM D570 | 8.1 | 3.2 | NM | 2.9 | 2.8 | NM | 3.3 |
| Water Absorption (%) (14 days) ASTM D570 | 13 | 5.1 | NM | 4.8 | 4.6 | NM | 5.2 |
| Water Absorption (%) (21 days) ASTM D570 | 14 | 5.5 | NM | 4.8 | 5.0 | NM | 5.8 |
| Water Absorption (%) (28 days) ASTM D570 | 15 | 6.2 | NM | 5.4 | 5.8 | NM | 6.7 |
| Water Absorption (%) (35 days) ASTM D570 | 16 | 7.0 | NM | 5.9 | 6.4 | NM | 7.3 |
| Water Absorption (%) (42 days) ASTM D570 | 16 | 7.7 | NM | 6.6 | 7.0 | NM | 7.9 |

TABLE 7

|  | Example | | | | | | | |
| --- | --- | --- | --- | --- | --- | --- | --- | --- |
|  | 13 | 14 | 15 | 16 | 17 | 18 | 19 | 20 |
| Notched Izod at 23 C., Ft-lb/in (average of 5 samples) ASTM D256 | 0.5 | 1.0 | 0.5 | 0.5 | 0.5 | 0.5 | 0.6 | 0.5 |
| Tensile Strength (psi) (ASTM D638) | 3600 | 2700 | 3700 | 3200 | 3900 | 3200 | 4200 | 3700 |
| Flex Break Strength (psi) (ASTM D790) | 6000 | 4000 | 5600 | 5300 | 5700 | 5200 | 6500 | 5500 |
| Flex Modulus (kpsi) (ASTM D790) | 460 | 390 | 470 | 430 | 470 | 450 | 520 | 440 |

As the data show in Table 4, Examples 3 and 5 provide improved tensile strength and flexural modulus relative to Comparative Example C1. Table 5 provides rheology data which indicate that the novel compositions of this invention have similar flow characteristics as the comparative examples.

Table 6 contains data for compositions containing HDPE and wood flour. The data indicate improved flexural strength and tensile strength of Examples 10, 11, and 12 relative to Comparative Example C6. In addition, the water absorption test results outlined in Table 6 indicate improved performance of Examples 10 and 12 relative to Comparative Example C6. Furthermore Example 10, which includes 0.5 wt % of a functional comonomer containing ethylene copolymer, has improved water absorption (7.0% after 42 days immersion) relative to Comparative Example C7 which uses 0.5 wt % of a traditional maleic anhydride grafted coupling agent (7.7% after 42 days immersion).

Table 7 has data from additional examples that use coupling agent additives derived from ethylene copolymers that contain functional comonomers. These examples show improvement in strength relative to the comparative examples.

Having thus described and exemplified the invention with a certain degree of particularity, it should be appreciated that the following claims are not to be so limited but are to be afforded a scope commensurate with the wording of each element of the claim and equivalents thereof.

What is claimed is:

1. A wood composite composition, comprising:
   (1) wood flour; and
   (2) from about 42 weight % to about 55 weight %, based on the total weight of the wood composite composition, of a polymeric matrix composition comprising
      (a) a high density polyethylene base resin in an amount from about 42 weight % to about 50 weight %, based on the total weight of the wood composite composition; and
      (b) a compatibilizing dipolymer consisting of copolymerized units of ethylene and about 4 weight % to about 9 weight %, based on the weight of the dipolymer, of ethyl hydrogen maleate, wherein i) said dipolymer is prepared by copolymerization of ethylene and said functional comonomer in a high-pressure free radical copolymerization process, and ii) said dipolymer is included in the wood composite composition in an amount from about 0.1 weight % to about 5 weight % of the total weight of the wood composite composition.

2. A composition of claim 1 wherein the compatibilizing dipolymer is included in the wood composite composition in an amount of from about 0.1 weight % to about 1 weight % of the total weight of the wood composite composition.

3. A composition of claim 1 wherein the dipolymer consists of copolymerized units of ethylene and about 6 weight % to about 9 weight %, based on the weight of the dipolymer, of ethyl hydrogen maleate.

4. An article comprising a wood composite composition of claim 1.

5. The article of claim 4 wherein the article is suitable for use as a decorative molding, picture frame, furniture, porch deck, railing, window molding, window component, door component, roofing system or other structural member.

* * * * *